Figure 1:
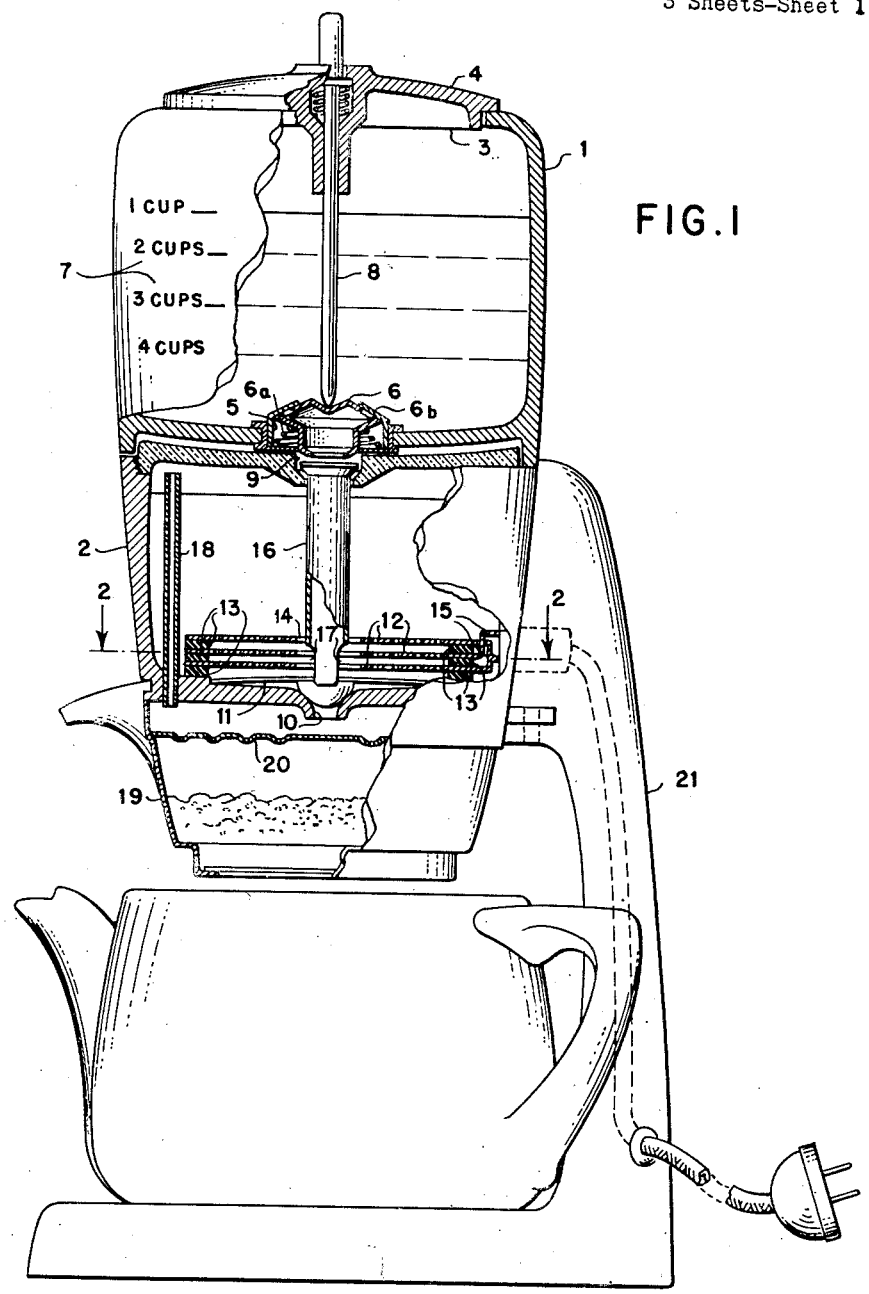

INVENTOR.
Glen Holland

Oct. 23, 1956 G. HOLLAND 2,767,640
COFFEE MAKING APPARATUS
Filed April 1, 1953 3 Sheets-Sheet 2
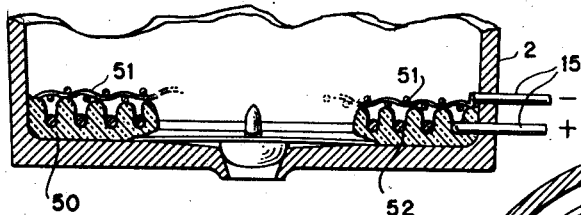
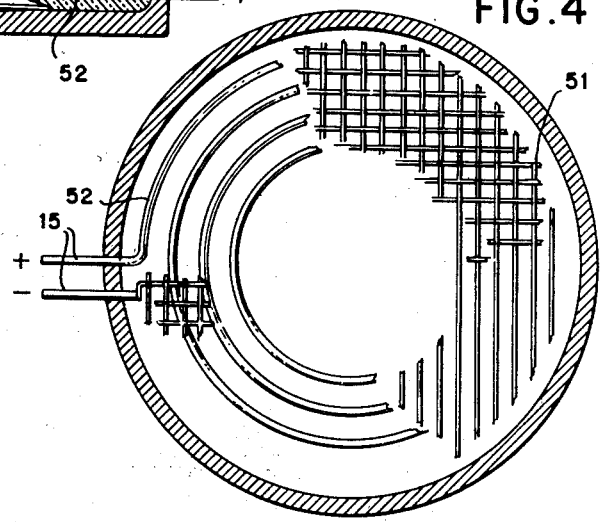
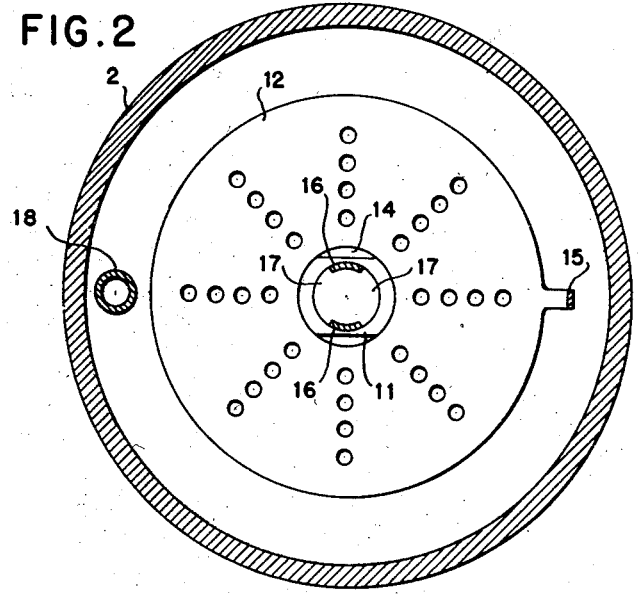
INVENTOR.
Glen Holland Oct. 23, 1956  G. HOLLAND  2,767,640
COFFEE MAKING APPARATUS
Filed April 1, 1953  3 Sheets-Sheet 2
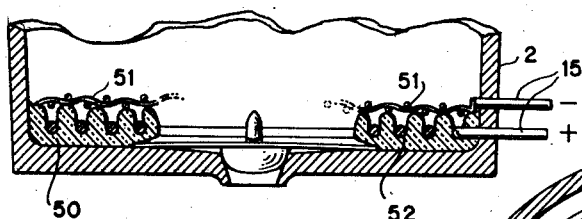
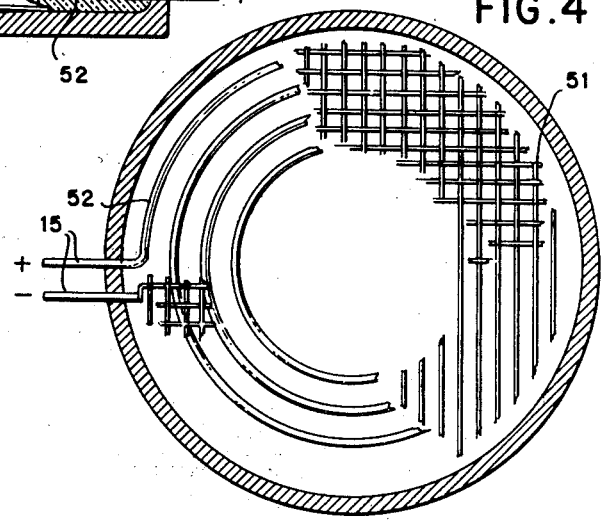
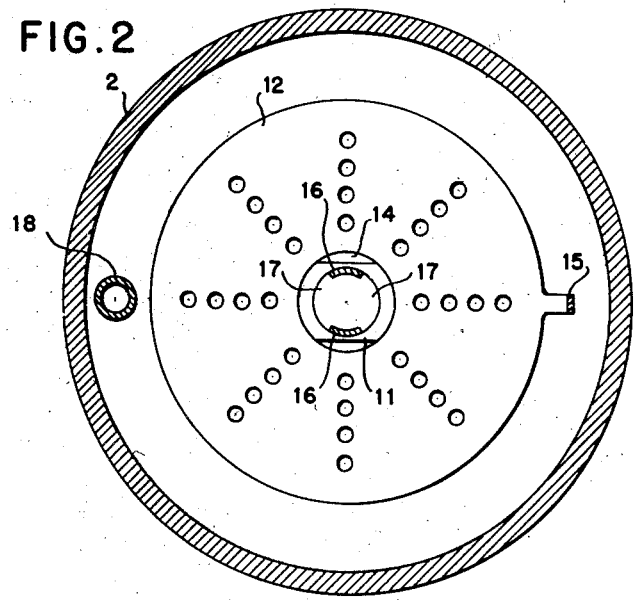
INVENTOR.
Glen Holland Oct. 23, 1956   G. HOLLAND   2,767,640
COFFEE MAKING APPARATUS
Filed April 1, 1953   3 Sheets-Sheet 3
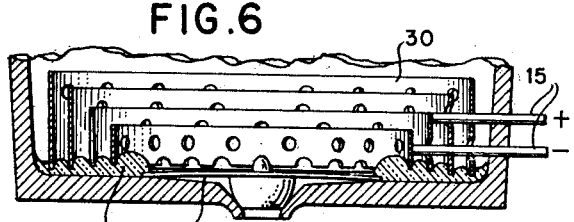
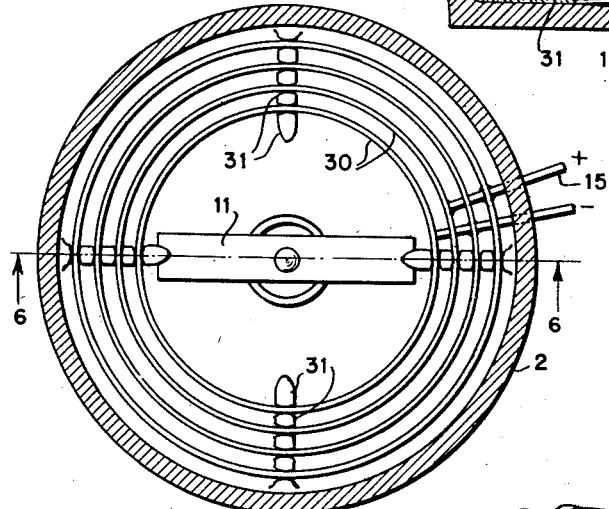
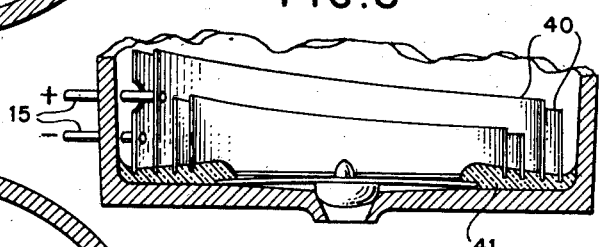
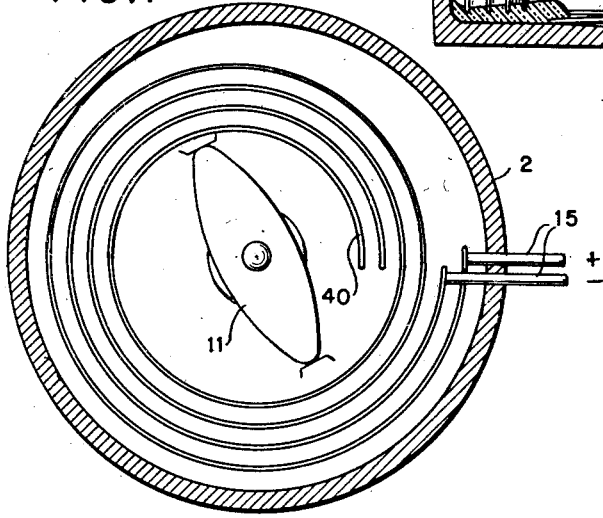
INVENTOR:
Glen Holland

2,767,640
COFFEE MAKING APPARATUS

Glen Holland, Bronxville, N. Y.

Application April 1, 1953, Serial No. 346,186

3 Claims. (Cl. 99—283)

My invention relates to apparatus for heating selected small increments of water in very short time intervals and dispensing the water at or near its boiling temperature. More particularly, it relates to apparatus for measuring, heating and dispensing amounts of the order of 1 to 4 cups of water every minute or so which may be used, for example, for making small portions of a hot beverage, such as coffee or tea, or for other purposes for which small portions of hot water are needed quickly.

For persons who desire an occasional cup of coffee, conventional coffee making apparatus is not suitable either because they make larger than required amounts of coffee, or because they require too much time or effort to make a single cup. The apparatus of my invention overcomes these difficulties by providing a water heater which with little effort and in a minute or so produces a cup of boiling water suitable for making so-called instant coffee, tea, hot chocolate, etc. With slight modification the apparatus can be made to produce a cup of drip coffee.

The apparatus of my invention includes a water supply receptacle, a water heater receptacle situated below the water supply receptacle and an electrical unit within the water heating receptacle for the conduction heating of water. Mechanically controlled metering means for transferring a relatively small amount of water by gravity flow from the water supply receptacle to the water heating receptacle and thermostatically controlled dispensing means for ejecting the relatively small amount of water at a suitable temperature from the water heating receptacle are provided, the mechanically controlled metering means coacting with the thermostatically controlled metering means in open position through a suitable plunger connection to mechanically close the thermostatically controlled dispensing means. Advantageously, the metering means comprises a spring valve and the dispensing means a bimetal valve.

My invention will now be described with reference to the accompanying drawings in which Figure 1 represents a sectional view of a typical form of water heater with attachments for making drip coffee and in which Figure 2 represents a section taken at 2—2 of Figure 1. Figures 3 and 4, 5 and 6, and 7 and 8 represent elevation and plan views of various types of electrical heating units which may be incorporated within the water heating receptacle.

In Figure 1, numeral 1 represents the water supply receptacle and numeral 2 the water heating receptacle. Water supply receptacle 1 has an upper opening 3 fitted with cover plate 4 and a lower opening 5 normally closed by spring valve 6 and spring 6A and valve housing 6B. It may be constructed of glass or plastic and has graduations 7 on its side indicating cupfuls of water. Plunger 8 extending from spring valve 6 upwardly through water receptacle 1 and cover plate 4 serves to open spring valve 6 by pressure from above. Water heating receptacle 2 may be of a ceramic material and has an upper opening 9 in a removable cover plate and a lower opening 10. Lower opening 10 is normally closed by bimetal valve 11 which is constructed to open at a temperature at or near the boiling point of water. Heating plates 12 are mounted on insulated supports 13 within water heating receptacle 2. Heating plates 12 are perforated, have a centrally located opening 14 and are connected with electrodes 15 leading to an electrical connection. Hollow member 16 is attached to bimetal valve 10 and extends upwardly through central opening 14 in heating plates 12 and is separated from spring valve 6 when the bimetal valve is in the closed position by a space approximating the vertical rise of the bimetal valve when in the open position. Hollow member 16 has openings 17 in its lower end for passage of water into heating receptacle 2. Figure 2 further illustrates the lower portion of the water heating receptacle 2 shown in Figure 1 with corresponding numerals. Vent tube 18 is situated within water heating receptacle 2 extending from near the top through the bottom thereof and provides means for steam exit from heating receptacle 2. Coffee container 19 is detachably connected with heating receptacle 2. It has a perforated bottom and a removal perforated plate above the space provided for coffee grounds. Heating receptacle 2 is suitably supported by mounting 21.

In operation of the apparatus of Figure 1, water contained in water supply receptacle 1 is metered into water heating receptacle 2 by applying pressure on plunger 8 for an amount of time required for the water level to drop a number of graduations corresponding to the number of cups of coffee desired. The water flows around spring valve 6, into and around hollow member 16, out openings 17 and covers plates 12 making an electrical contact. As the water is heated it circulates upwards through the perforations so that the water in heating receptacle 2 is uniformly and quickly heated to boiling temperature. Steam escapes through vent 18. When the water in heating receptacle 2 has reached boiling temperature, bimetal valve 11 opens and the water is ejected through opening 10 onto plate 20. It passes through the coffee in container 19 and then into a cup or pot positioned beneath heating receptacle 2. If additional coffee or hot water is required before the bimetal valve has cooled so as to close opening 9, pressure upon plunger 8 to admit another portion of water to heating receptacle 2 mechanically closes bimetal valve 11 by coaction between plunger 8 and member 16. The cold water admitted cools the bimetal valve sufficiently to maintain it in a closed position until the water in heating receptacle 2 is heated to ejection temperature.

The water heating receptacle portion of the apparatus of my invention has many safety features. For example, its construction of a ceramic material completely insulates the user from electrical contact with the water making contact between the electrodes. The provision of hollow member 16 in opening 9 prevents insertion of an electrically conductive article into opening 9 which might make contact between plates 12. In addition the effective area of plates 12 may be readily adjusted to draw less than 1650 watts, the capacity of the standard electrical outlet.

Several embodiments of the electrical heating unit incorporated in the water heating receptacle are illustrated in Figures 3 and 4, 5 and 6, and 7 and 8. The electrical heating unit is designed so that the area of the plates or other conducting elements is sufficiently large to provide a high rate of heat input but small enough and spaced sufficiently so that they do not draw excess wattage.

Figures 3 and 4 illustrate a wire 50 and grid 51 electrical unit. Wire 50 is set in grooves 52 and grid 51 is supported above wire 50.

Figures 5 and 6 illustrate vertically mounted perforated heating plates 30 held in place in heating receptacle 2 by studs 31 and alternately connected to electrodes 15. Vertical plates 30 may be of differing heights as shown so that the maximum conducting surface is available for increasing levels of water in the receptacle 2. The bimetal valve is indicated by numeral 11.

Figures 7 and 8 illustrate helical type heating surfaces 40 set in grooves 41 and connected to electrodes 15.

I claim:

1. In a water heater for dispensing selected relatively small increments of hot water in very short time intervals, the combination which comprises a water supply receptacle, a water heating receptacle situated below the water supply receptacle and provided with an electrical unit for conduction heating of water, mechanically controlled metering means for transferring a relatively small amount of water from the water supply receptacle to the water heating receptacle, thermostatically controlled dispensing means for ejecting the relatively small amount of water from the water heating receptacle at a suitable temperature, connecting means extending upwardly from the thermostatically controlled dispensing means and separated from the under surface of the mechanically controlled metering means when the thermostatically controlled dispensing means is in closed position by a space approximating the vertical rise of the thermostatically controlled dispensing means when in open position, said mechanically controlled metering means and said thermostatically controlled dispensing means being movable independently of each other and capable of separate actuation with the proviso that the mechanically controlled metering means when actuated coacts with the thermostatically controlled dispensing means in open position through connecting means to mechanically close the thermostatically controlled dispensing means.

2. In a water heater for dispensing selected relatively small increments of hot water in very short time intervals, the combination which comprises a water supply receptacle, a water heating receptacle situated below the water supply receptacle and provided with an electrical unit for conduction heating of water, a normally closed spring valve situated in the lower portion of the water supply receptacle for transferring a relatively small amount of water from the water supply receptacle to the water heating receptacle, a thermostatically controlled normally closed bimetal valve for ejecting the relatively small amount of water at a suitable temperature from the water heating receptacle, a member extending upwardly from the bi-metal valve and separated from the under surface of the spring valve when the bi-metal valve is in closed position by a space approximating the vertical rise of the bi-metal valve when in open position, and a mechanical control means for opening the spring valve, said mechanical control means and said bimetal valve being normally independent of each other and capable of separate actuation with the proviso that the mechanical control means when opening the spring valve coacts with the bimetal valve in open position to mechanically close the bimetal valve.

3. In a water heater for dispensing selected relatively small increments of boiling water in very short time intervals, the combination which comprises a graduated water supply receptacle having openings in its upper and lower portions, a mechanically operated normally closed spring valve situated within the lower opening, an actuating member extending upwardly from the spring valve through the upper opening, a water heating receptacle situated immediately below but thermally insulated from the water supply receptacle, a plurality of perforated heating plates having centrally located openings therein supported within the water heating receptacle and electrically insulated from each other and from the water heating receptacle, a pair of electrodes each connecting alternate heating plates and each electrically insulated from each other and from the water heating receptacle, an opening in the lower portion of the water heating receptacle, a bimetal member situated adjacent to and normally closing the opening in the lower portion of the water heating receptacle forming a thermostatic valve adapted to open at a temperature near the boiling point of water, a member extending upwardly from the bimetal member through the openings in the plates and separated from the under surface of the spring valve when the bimetal member is in the normal position by a space approximating the vertical rise of the bimetal member when the thermostatic valve is in the open position, and a container having a perforated bottom detachably connected to the lower portion of the water heating receptacle.

References Cited in the file of this patent

UNITED STATES PATENTS

| | | |
|---|---|---|
| 647,145 | Meyer | Apr. 10, 1900 |
| 748,910 | Acker | Jan. 5, 1904 |
| 1,210,079 | Kelly | Dec. 25, 1916 |
| 1,787,394 | Russell | Dec. 30, 1930 |
| 2,029,596 | Smith | Feb. 4, 1936 |
| 2,176,081 | Kise | Oct. 17, 1939 |
| 2,245,238 | Watson | June 10, 1941 |
| 2,292,853 | Wilcox | Aug. 11, 1942 |
| 2,523,261 | Alvarez et al. | Sept. 26, 1950 |
| 2,615,384 | Ranz | Oct. 28, 1952 |